United States Patent [19]

Indri

[11] 3,922,483

[45] Nov. 25, 1975

[54] TUNABLE TELEVISION RECEIVER CIRCUITS WITH AUTOMATIC PHASE CONTROL

[75] Inventor: Luigi Indri, London, England

[73] Assignee: Thorn Electrical Industries Limited, London, England

[22] Filed: Nov. 14, 1973

[21] Appl. No.: 415,495

[30] Foreign Application Priority Data

Apr. 10, 1973 United Kingdom .............. 17174/73

[52] U.S. Cl. ............................ 178/5.8 AF; 325/423

[51] Int. Cl.² ............................................ H04N 5/50

[58] Field of Search ......... 178/5.8 AF, 5.8 R, 7.3 R; 325/418, 419, 423, 422

[56] References Cited

UNITED STATES PATENTS

| | | | |
|---|---|---|---|
| 3,562,416 | 2/1971 | Ennasingel | 178/5.8 R |
| 3,588,706 | 6/1971 | Sakai et al. | 325/418 X |
| 3,624,512 | 11/1971 | Evans | 178/5.8 AF X |
| 3,673,319 | 6/1972 | Humphrey | 178/5.8 R X |
| 3,676,582 | 7/1972 | Humphrey | 178/5.8 AF |
| 3,784,917 | 1/1974 | Kenyon | 325/422 |

*Primary Examiner*—Howard W. Britton
*Assistant Examiner*—Mitchell Saffian
*Attorney, Agent, or Firm*—Robert E. Walrath; Thomas H. Buffton; Ralph W. Burnett

[57] ABSTRACT

A television receiver circuit has a tunable local oscillator coupled to a mixer which produces a picture intermediate frequency signal and a sound intermediate frequency signal. A synchronous demodulator receives the intermediate frequency signals from the mixer and a reference signal from a resonant circuit including a variable reactance device whose reactance is controlled to cause the resonance frequency to be the same as the picture intermediate frequency despite variation thereof from a reference value of the picture intermediate frequency.

2 Claims, 3 Drawing Figures

TUNABLE TELEVISION RECEIVER CIRCUITS WITH AUTOMATIC PHASE CONTROL

BACKGROUND OF THE INVENTION

When using a television broadcast receiver with a receiving antenna it is fairly frequently found that to obtain the best possible picture it is necessary to adjust the tuning of the receiver to a frequency which is slightly offset from the frequency of the television broadcast frequency to be received. Such a circumstance can occur as a result of the site of the antenna in relation to its surroundings giving rise to interference between direct and reflected waves at the antenna, or incorrect installation of the antenna, or poor quality television broadcast signals. A picture detector employing one or more diodes as envelope detecting devices can cope with such deliberate mistuning of the receiver, but inherently has poor linearity and cross talk rejection because of the non-linearity of the diode characteristic. If a synchronous demodulator is used as the picture detector in the receiver, and has as its detecting devices transistors which are constrained to operate only in the linear portions of their characteristics, there is inherently in the picture detector better linearity and a better cross talk rejection, but if a fixed reference frequency excited by supplying a vision intermediate frequency to a circuit resonant at the fixed reference frequency is employed the picture detector cannot cope with deliberate mistuning of the receiver and gives rise to ringing effects in the video signal at each transistion from black to white and vice versa so that there is a loss of definition in the picture produced by the receiver. Television broadcast receivers can be constructed with automatic frequency control circuits which prevent mistuning and therefore avoid such ringing effects if the picture detector is a synchronous demodulator with linearly operated transistors, but as a result no adjustment to the tuning of the receiver can be made to obtain any improvement where mistuning would give a better picture.

Monochrome television broadcast receivers are usually not provided with automatic frequency control circuits, and colour television broadcast receivers can be made which do not include automatic frequency control circuits.

If a synchronous demodulator with linearly operated transistors is used as picture detector in a television broadcast receiver, colour or monochrome, and is in operation supplied with a fixed reference frequency excited by application of a picture intermediate frequency to a circuit resonant at the fixed reference frequency, the aforementioned ringing effects can be reduced by loading the resonant circuit so that it has a low Q, but this reduces the cross talk rejection to such an extent that the synchronous demodulator is no better than a diode circuit.

SUMMARY OF THE INVENTION

According to the present invention there is provided a television receiver circuit including means for supplying television broadcast frequency signals to a mixer, and a tunable local oscillator so coupled to the mixer that in operation the mixer produces a picture intermediate frequency signal and a sound intermediate frequency signal at frequencies equal to the differences between the frequencies of the local oscillator and the television broadcast frequency signals. The mixer is coupled to supply the intermediate frequency signals to a synchronous demodulator and to means for producing a control signal representative of error between the picture intermediate frequency signal and a reference value of the picture intermediate frequency. The synchronous demodulator has a modulated signal input connection coupled to the mixer to receive the intermediate frequency signals, and a reference signal input connection connected to a resonant circuit which is coupled to the mixer to receive the intermediate frequency signals. The resonant circuit includes a variable reactance device coupled to the said means for producing a control signal. The synchronous demodulator demodulates the picture intermediate frequency signal with respect to resonance oscillations set up in the resonant circuit, the said control signal serving to cause the resonance frequency of the resonant circuit to be the same as the picture intermediate frequency at least over a predetermined range of frequency.

In a preferred embodiment the said means for producing a control signal includes a further synchronous demodulator having a modulated signal input connection coupled to the mixer to receive the intermediate frequency signals, a reference signal input connection connected to a further resonant circuit which is coupled to the first said resonant circuit, and an output signal connection coupled to the said variable reactance device.

Preferably the variable reactance device is a varactor diode. The first said resonant circuit may be a parallel resonant circuit in which the varactor diode contributes part of the capacitance. The said further resonant circuit may be a parallel resonant circuit also.

In the preferred embodiment, both of the said synchronous demodulators are provided by one integrated circuit, namely the Mullard IC type TCA270 manufactured by Mullard Limited, England.

DETAILED DESCRIPTION OF THE PREFERRED EMBODIMENT

Figure 1:
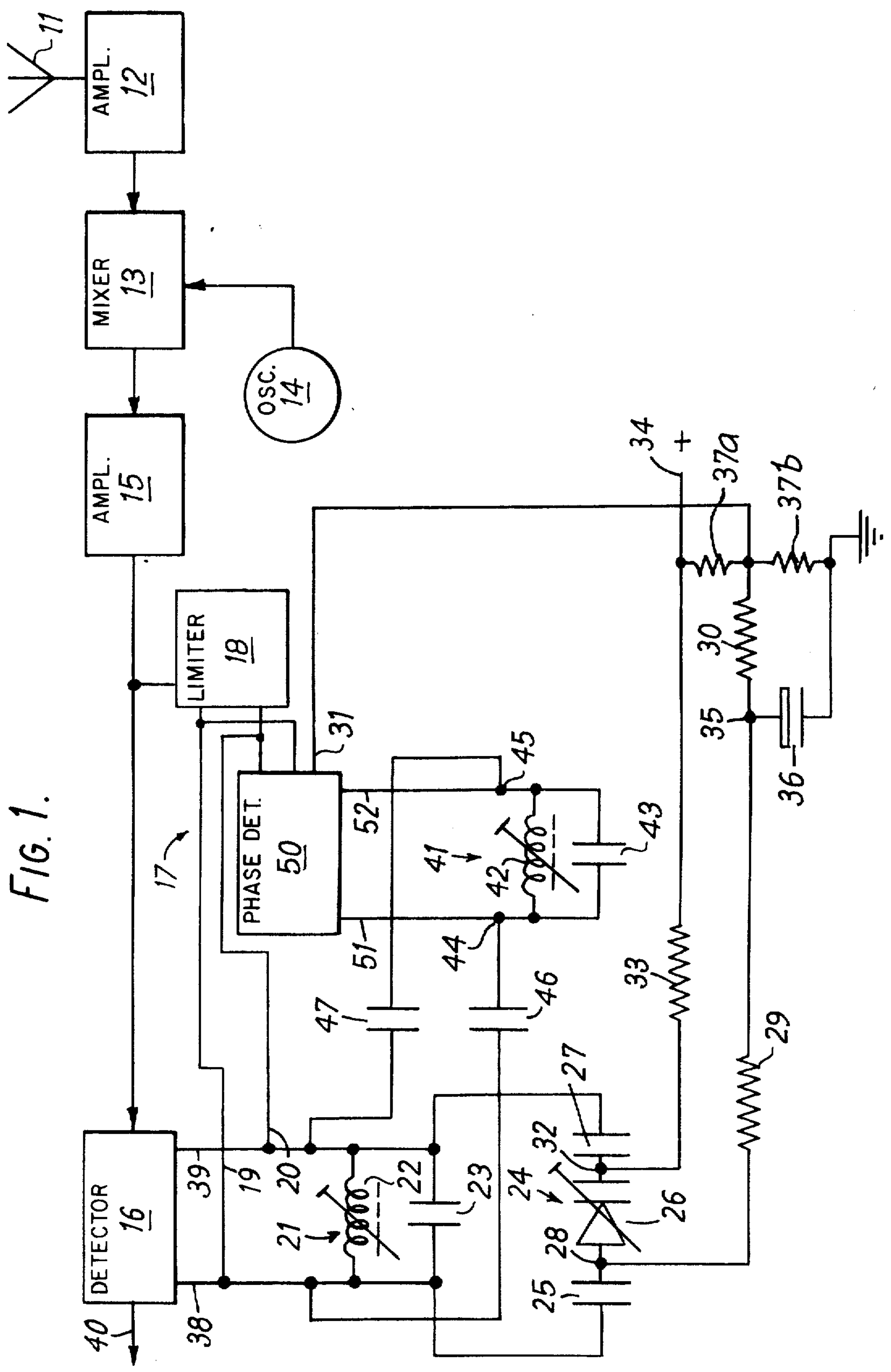
FIG. 1 is a diagrammatic representation of part of a colour television broadcast receiver.

In a preferred embodiment of the present invention, a synchronous demodulator with linearly operated transistors is used as the picture detector in a television broadcast receiver and is in operation supplied with a controlled reference frequency signal excited by application of a picture intermediate frequency signal to a circuit resonant at a controllable reference frequency. FIG. 1 of the accompanying drawings shows such an embodiment of the invention. This embodiment includes a UHF receiving antenna 11, connected to a UHF amplifier 12 having its output connection connected to a signal input connection of a mixer 13 which has a reference input connection connected to an output connection of a local oscillator 14 which is of variable frequency, the frequency of the oscillator 14 being adjustable mechanically by manually operable means (not shown). The mixer 13 has an output connection coupled through an intermediate frequency amplifier 15 to a vision detector 16, and a control circuit 17 through a limiter-amplifier 18 the control circuit 17 comprises a synchronous demodulator or phase detector 50.

The limiter-amplifier 18 has a pair of output terminals 19 and 20 across which a resonant circuit 21 is connected. The resonant circuit consists of a variable inductor 22, a fixed capacitor 23 connected in parallel with the inductor 22, and a series combination 24 of three capacitors, the combination 24 being connected in parallel with the inductor 22 and the capacitor 23. The combination 24 consists of a fixed capacitor 25 connected to a varactor diode 26 which is connected to a fixed capacitor 27. The common point 28 of connection of the capacitor 25 and the varactor diode 26 is coupled through a series combination of two resistors 29 and 30 to the common point of connection of two resistors 37*a* and 37*b* which is connected to an output terminal 31 of the control circuit 17. The common point 32 of connection of the varactor diode 26 and the capacitor 27 is coupled through a resistor 33 to a supply terminal 34 to which a positive reference voltage is supplied in operation. The common point 35 of connection of the resistors 29 and 30 is coupled to ground through an electrolytic capacitor 36, and the terminal 34 is coupled to ground through the resistor 37*a* and 37*b* in series.

In operation the capacitance of the varactor diode 26 is set by the difference between a control voltage which is produced at the connection point 35 and the reference voltage at the terminal 34. The terminal 31 acts as a current source or sink and thereby determines the voltage at the common point of connection of the resistors 37*a* and 37*b*. Thus the resonance frequency of the resonant circuit 21 is controlled by the control circuit 17.

The resonant circuit 21 is connected across a pair of reference input terminals 38 and 39 of the picture detector 16 which is a synchronous detector with linearly operated transistors, and has an output connection 40 at which, in operation, detected video signals are produced together with a frequency modulated sound carrier which, for example, has a datum frequency of 6 megahertz.

In operation, the control voltage at the connection point 35 is determined in response to an intermediate frequency propagated in the resonant circuit 21 and a further resonant circuit 41 consisting of a variable inductor 42 connected in parallel with a fixed capacitor 43, the opposite ends 44 and 45 of the resonant circuit 41 being respectively coupled to the terminals 38 and 39, and therefore to the opposite ends of the resonant circuit 21 through equal fixed capacitors 46 and 47. When the frequency of the local oscillator 14 is set so that the intermediate frequencies produced by the mixer 13 are at the standard expected values for vision and sound intermediate frequencies in a television broadcast receiver, for example, 39.5 megahertz and 33.5 megahertz respectively, the intermediate frequency propagated in the resonant circuits 21 and 41 is the standard expected value of the vision intermediate frequency. It is arranged that in these circumstances the voltage at the connection point 35 sets the value of the capacitance of the varactor diode 26 at a datum value which renders the circuit 21 resonant at the standard expected value for the vision intermediate frequency. The intermediate frequency amplifier 15 attenuates the sound intermediate frequency relative to the picture intermediate frequency, and the limiter-amplifier 18 removes amplitude modulation in the picture intermediate frequency and with the resonant circuit 21 substantially blocks the sound intermediate frequency at its output terminals 19 and 20.

In the control circuit 17 the output terminals 19 and 20 of the limiter-amplifier 18 are connected to a synchronous demodulator 50 having linearly operated transistors as its detecting elements and a pair of reference input terminals 51 and 52. The demodulator 50 constitutes the output stage of the control circuit 17, the output terminal 31 being the output signal terminal of the demodulator 50.

The resonant circuit 41 is resonant at the standard value of the picture intermediate frequency and is connected across the reference input terminals 51 and 52 of the demodulator 50. When the intermediate frequencies produced by the mixer 13 are at their standard expected values, the phase difference between the intermediate frequency input signal supplied to the demodulator 50 by the limiter-amplifier 18 and the picture intermediate frequency reference signal applied to the reference input terminals 51 and 52 is such that the demodulator 50 produces a substantially zero current at the terminal 31 so that the voltage at the common connection point of the resistors 37*a* and 37*b* is determined solely by division of the voltage supplied to the terminal 34. This voltage constitutes the control voltage required to tune the resonant circuit 21 for resonance at the standard expected value of the vision intermediate frequency. The capacitor 36 with the resistor 30 acts as a filter which removes any residual detected video signal present at the terminal 31, which may occur if the detector 50 or the divider 18 is not perfectly balanced.

Although the picture detector 16 and the demodulator 50 are both synchronous demodulators, the detector 16 must operate as an amplitude demodulator, whereas the demodulator 50 must operate as a phase demodulator.

If the local oscillator 14 is adjusted to cause the mixer 13 to produce intermediate frequencies which differ from the standard expected values, the limited vision intermediate frequency signal, which in this case will be referred to as the off-standard picture intermediate frequency signal, is again supplied to the demodulator 50 and to the terminals 38 and 39, and the amplitude modulated off-standard picture intermediate frequency signal is supplied by the intermediate frequency amplifier 15 to the signal input connection of the picture detector 16. Consequently the off-standard picture intermediate frequency signal is propagated in the resonant circuits 21 and 41. The circuit 41 is tuned to resonance at the standard expected value of the picture intermediate frequency and therefore appears either inductive or capacitive depending on which of the two values, the off-standard picture intermediate frequency or the standard expected value, is the higher of the two. Thus the phase difference between the off-standard intermediate frequency input signal supplied to the demodulator 50 by the output terminals 19 and 20 of the limiter-amplifer 18 and the off-standard picture intermediate frequency reference signal supplied to the reference input terminals 51 and 52 differs from that occurring when the two signals are at the standard expected value of the picture intermediate frequency, and results in a control voltage appearing at the connection point 35 which changes the capacitance of the diode 26 until the circuit 21 is in resonance at the frequency of the off-standard picture intermediate frequency supplied thereto by the mixer 13. Since the resonance frequency of the circuit 41 is not altered, there remains a phase difference between the two signals applied to the demodulator 50 which differs from that occurring when two signals are at the standard expected value of the picture intermediate frequency and which is such as to hold the capacitance of the diode 26 at that value which renders the circuit 21 resonant at the frequency of the off-standard picture intermediate frequency. The time constant of the combination of the resistor 30 and the capacitor 36 is chosen to ensure sufficient damping of the control voltage at the point 35 for the resonance frequency of the circuit 21 to follow smoothly changes in the frequency of the picture intermediate frequency produced by the mixer 13.

In a constructed example of the embodiment of FIG. 1, the detector 16, the limiter-amplifier 18, and the demodulator 50 are incorporated in a single integrated circuit manufactured by Mullard Limited, England, and designated TCA270. In this constructed example, other items have the following values:

| Item | Value |
|---|---|
| inductor 22 | |
| capacitor 23 | 100 picofarads |
| capacitor 25 | 120 picofarads |
| capacitor 27 | 120 picofarads |
| inductor 42 | |
| capacitor 43 | 47 picrofarads |
| capacitor 46 | 0.5 picofarads |
| capacitor 47 | 0.5 picofarads |
| resistor 29 | 100 kilohms |
| resistor 33 | 100 kilohms |
| resistor 30 | 10 kilohms |
| resistor 36 | 4.7 microfarads |
| resistor 37*a* | 100 kilohms |
| resistor 37*b* | 100 kilohms |

The voltage supplied to the terminal 34 is +12 volts, and the varactor diode 26 is a type BA102 manufactured by Mullard Limited, England.

The inductors 22 and 42 are ferrite core variable inductors, the cores of which are initially adjusted to render the circuits 21 and 41 resonant at the standard expected value of the picture intermediate frequency when the voltage across the resistor **37*a* is at the value pertaining when no current is issued from or drawn by the terminal 31.**

Figure 2:
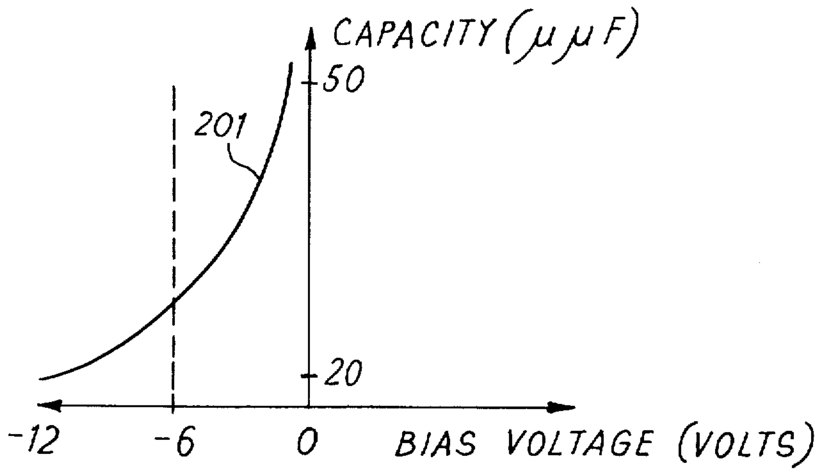
FIGS. 2 and 3 are graphs useful in explaining the operation of the receiver of FIG. 1.
Figure 3:
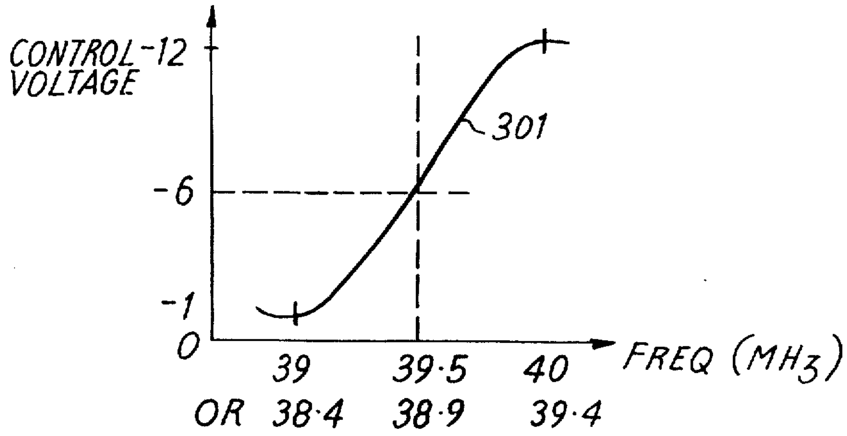

FIG. 2 shows as a curve 201 the variation of the capacity of the diode type BA 102 with voltage, the voltage being measured at the anode of the diode relative to its cathode. FIG. 3 shows the required range of frequency for a United Kindom PAL receiver, namely, 39 to 40 megahertz, and the required range of frequency for a German PAL receiver, namely, 38.4 to 39.4 megahertz, and the corresponding range of voltage of the connection point 35 relative to the terminal 34. A curve 301 in FIG. 3 shows the variation of voltage at the point 35 relative to the terminal 34 with the frequency of the picture intermediate frequency produced by the demodulator 50 of the aforementioned constructed example of the embodiment of FIG. 1.

I claim:

1. In a television receiver having a mixer stage coupled to a tunable local oscillator stage and to a source of television signals to provide picture and sound intermediate frequency signals, a tunable automatic phase control circuit comprising:

synchronous demodulator detector means coupled to the output of said mixer stage for receiving said picture and sound intermediate frequency signals;

amplitude limiting amplifier means coupled to said mixer stage and providing a first picture intermediate frequency signal of unmodulated amplitude;

resonant circuit means coupled to said synchronous demodulator detector means and to said amplitude limiting amplifier means, said resonant circuit means including a variable reactance means in the form of a varactor diode;

reference frequency resonant circuit means coupled to said resonant circuit means and providing a second picture intermediate frequency signal of unmodulated amplitude;

phase difference detecting synchronous demodulator means coupled to said amplitude limiting amplifier means and said resonant circuit means and to said reference frequency resonant circuit means, said phase difference detecting synchronous demodulator means receiving said first and second picture intermediate frequency signals of unmodulated amplitude and providing a control signal which varies in accordance with the phase difference between said first and second picture intermediate frequency signals; and circuit means coupling said control signal from said phase difference detecting synchronous demodulator means to said variable reactance means of said resonant circuit means whereby said resonant circuit means provides a resonance oscillation for effecting demodulation of said first picture intermediate frequency signal by said synchronous demodulator detector means.

2. A tunable automatic phase control circuit as claimed in claim 1, wherein the resonant circuit means is a parallel resonant circuit in which said varactor diode provides part of the capacitance.

* * * * *